Feb. 17, 1953  J. W. ENGLAND  2,628,856
TWINE HOLDER HAVING A TWINE GUIDING NOTCH
Filed April 14, 1952

INVENTOR
JOHN W. ENGLAND

BY *Mason, Mason & Sheridan*

ATTORNEYS

UNITED STATES PATENT OFFICE 2,628,856

TWINE HOLDER HAVING A TWINE GUIDING NOTCH

John W. England, Iowa Falls, Iowa

Application April 14, 1952, Serial No. 282,239

6 Claims. (Cl. 289—14)

This invention relates to a twine holder and particularly to an improved device for retaining the twine within the twine entraining disk of knotting devices.

In the ultilization of knot trying devices on such devices as reapers and haybalers, etc., it is customary to retain the cord or twine with which the bales or bundles are tied up in a twine entraining rotary disk in which a spring fastened finger assists in holding the cord or twine in the entraining disk. In heavy application, particularly in balers, difficulty is had because of the twine pulling out of the entraining disks, leaving loose bales when the same are dropped on the field.

The present invention provides a twine holder for cooperation with the twine engaging disk of the usual knotting device having sufficient twine engaging surface to prevent disengagement of the twine from the twine entraining disk. This is accomplished by providing, in addition to the usual central twine holding finger, a plurality of laterally spaced fingers extending over the outer circumference of the twine engaging disk so as to provide a plurality of twine engaging surfaces on the inner and outer sides of the twine engaging disk.

The present invention is an improvement over the structure disclosed and claimed in my application Serial No. 251,407, filed October 15, 1951, now Patent No. 2,594,140. The present invention includes the structure set forth in the aforesaid application modified however by a specially constructed plate-like finger.

Other objects will appear hereinafter throughout the specification.

The present twine holder is for use with knotters of the type shown and described in my application above identified, it is intended to take the place of the twine holder shown therein.

The present construction relates therefore to a twine holder arm 30 adapted for pivotal mounting on a knotting device, having a plurality of plate-like fingers including a central finger 32, which is adapted to pass between or is received in the space between the usual entwining wheels of a knotting device.

There are a pair of fingers 34, 36 which are parallel to each other and which lie in spaced parallel relation to the central finger 32.

The fingers have arcuate surfaces or edges 59 which are adapted to engage the twine holder to be presented to the rotary disks of the knotting device as in my application above identified.

Figure 2:
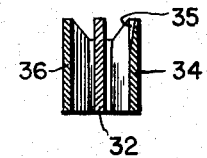
Figure 2 is a view of the twine holder taken at right angles to the view of Figure 1.
Figure 1:
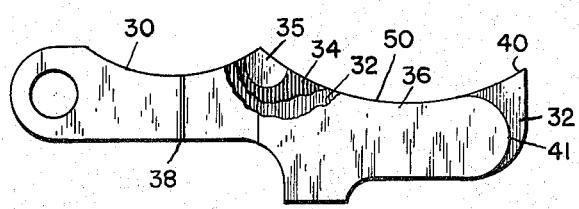
Figure 1 is a side view of the twine holder with portions of two of the plate-like fingers broken away.
Figure 3:
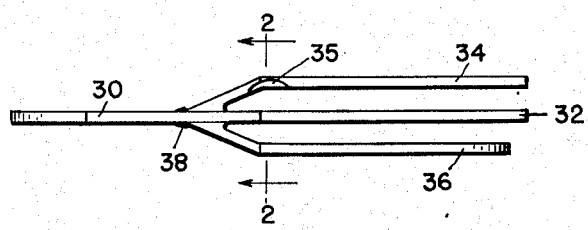
Figure 3 is a plan view of the twine holder shown in Figure 1.

The fingers 32, 34 are provided with hooked nose releases 40, and the outside finger 36, which is on the side furthest removed from the knotting element is provided with a rounded end 41 which rounded end is of shorter length than the hooked nose releases 40, as shown in Figure 1.

The present invention particularly relates to a twine guiding notch 35, shown in all three figures of the drawings. This notch is preferably located a substantial distance from the end of one of the fingers, such as finger 34.

This notch 35 guides the twine and prevents twine from disengagement with the twine holder finger 34, i. e. the notch prevents the twine from sliding along the finger 34, thus holding it in proper feeding position.

I do not wish to be limited in the practice of this invention to the exact position of the notch, although I prefer to locate it as shown in the several figures. I desire to be limited only to the extent indicated by the appended claims.

I claim:

1. A twine holder for use in a tying machine having a pair step by step twine engaging disks; said twine holder comprising a supporting arm having means adjacent one end for pivotally mounting the same and having a plate-like central presser finger extending therefrom and a pair of plate-like fingers mounted in spaced relation to said first presser finger, and at least one of said pair of fingers having a twine guiding notch.

2. A twine holder for use in a tying machine having a pair step by step twine engaging disks; said twine holder comprising a supporting arm having means adjacent one end for pivotally mounting the same and having a plate-like central presser finger extending therefrom and a pair of plate-like fingers mounted in spaced relation to said first presser finger, and at least one of said pair of fingers having a twine guiding notch, said first named presser finger and one of said pair of plate-like fingers being of substantially the same length and said other plate-like finger of said pair of fingers having a rounded end.

3. A twine holder for use in a tying machine having a pair step by step twine engaging disks; said twine holder comprising a supporting arm having means adjacent one end for pivotally mounting the same and having a plate-like central presser finger extending therefrom and a pair of plate-like fingers mounted in spaced relation to said first presser finger, and at least one of said pair of fingers having a twine guiding notch, said first named presser finger and one of said pair of plate-like fingers being of substantially the same length and each having a hooked nose, and said other plate-like finger of said pair of fingers having a rounded end.

4. A twine holder for use in a tying machine having a pair step by step twine engaging disks; said twine holder comprising a supporting arm having means adjacent one end for pivotally mounting the same and having a plate-like central presser finger extending therefrom and a pair of plate-like fingers mounted in spaced relation to said first presser finger, said pair of fingers having their adjacent longitudinal edges in the form of arcs, said pair of fingers having a twine guiding notch located on the side of said one finger next adjacent to the central finger and facing toward said finger, said notch being further located adjacent the junction of said fingers with said supporting arm.

5. A twine holder for use in a tying machine having a pair step by step twine engaging disks; said twine holder comprising a supporting arm having means adjacent one end for pivotally mounting the same and having a plate-like central presser finger extending therefrom and a pair of plate-like fingers mounted in spaced relation to said first presser finger, said pair of fingers having their adjacent longitudinal edges in the form of arcs, said first named presser finger and one of said pair of plate-like fingers being of substantially the same length and said other plate-like finger of said pair of fingers having a rounded end, said pair of fingers having a twine guiding notch located on the side of said one finger next adjacent to the central finger and facing toward said finger, said notch being further located adjacent the junction of said fingers with said supporting arm.

6. A twine holder for use in a tying machine having a pair step by step twine engaging disks; said twine holder comprising a supporting arm having means adjacent one end for pivotally mounting the same and having a plate-like central presser finger extending therefrom and a pair of plate-like fingers mounted in spaced relation to said first presser finger, said pair of fingers having their adjacent longitudinal edges in the form of arcs, said first named presser finger and one of said pair of plate-like fingers being of substantially the same length and each having a hooked nose, and said other plate-like finger of said pair of fingers having a rounded end, said pair of fingers having a twine guiding notch located on the side of said one finger next adjacent to the central finger and facing toward said finger, said notch being further located adjacent the junction of said fingers with said supporting arm.

JOHN W. ENGLAND.

No references cited.